Aug. 26, 1969 W. BRIGHT 3,463,035
METHOD OF PREPARING DIE PLATES
Filed Dec. 5, 1966 2 Sheets-Sheet 1
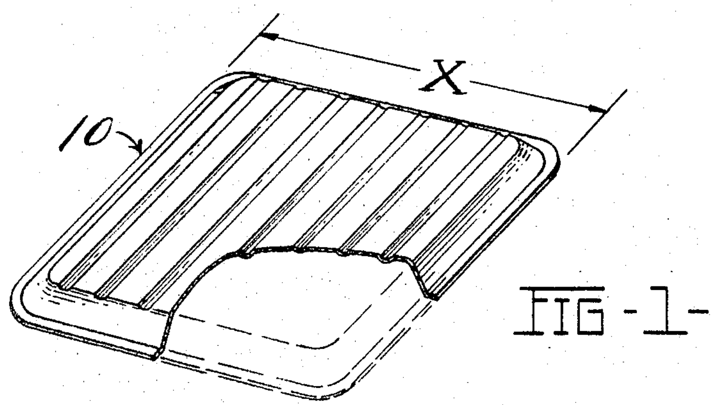
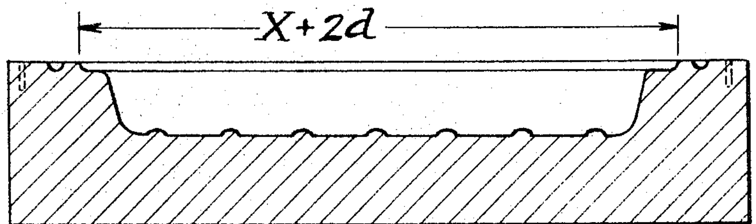
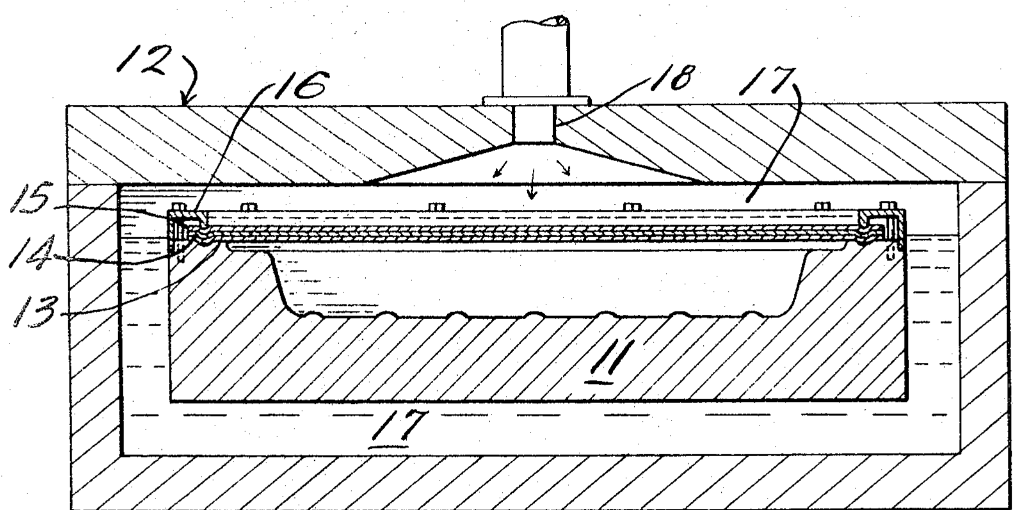
INVENTOR:
WILFRED BRIGHT.
BY Owen & Owen
ATT'YS.

METHOD OF PREPARING DIE PLATES
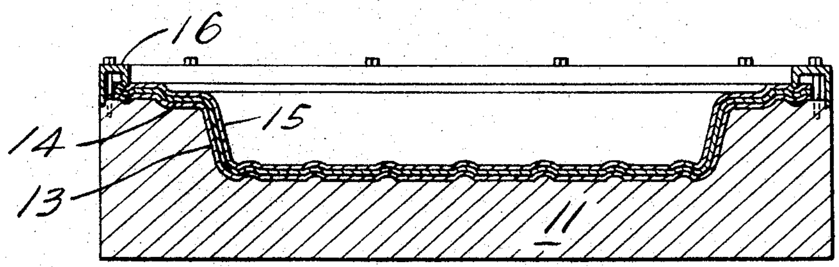
FIG-4-
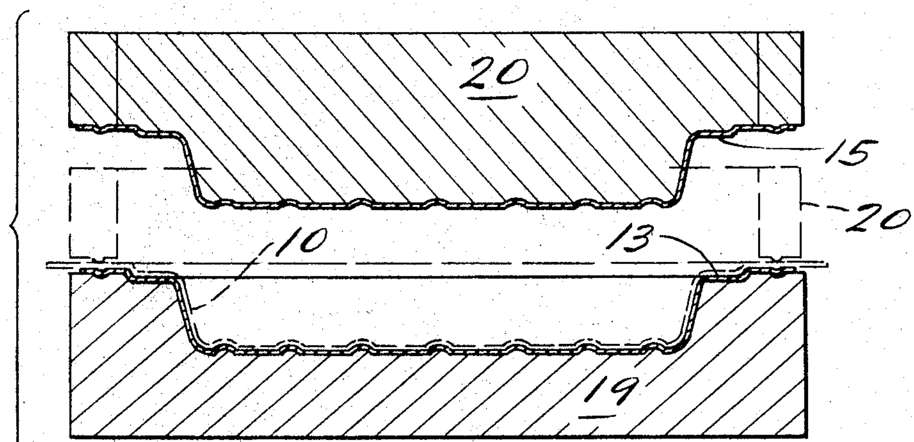
FIG-5-
INVENTOR:
WILFRED BRIGHT.
BY Owen + Owen
ATT'YS.

United States Patent Office 3,463,035

Patented Aug. 26, 1969

3,463,035

METHOD OF PREPARING DIE PLATES

Wilfred Bright, Higher Barton Hallwood Crescent, Shenfield, Essex, England

Filed Dec. 5, 1966, Ser. No.. 599,080
Int. Cl. B21k *5/20;* B21d *26/02*
U.S. Cl. 76—107 9 Claims This invention relates to a novel method of preparing matching die plates for stamping, casting, molding or forging a series of identical articles.

More specifically, this invention relates to a method of preparing matching die plates from a model of predetermined dimensions, which die plates may be used in various manufacturing procedures for reproducing cast, stamped or forged articles conforming in shape to the model surfaces so that a series of finished parts may be produced.

A major cost in producing high volume stamped, forged or die cast objects is in the tooling or making of the dies. Such dies must necessarily be composed of a material which will withstand the forces involved in their use and must be accurately matched to reproduce an article within certain dimensional tolerances. In place of the usual process of machining, or hot casting and then machining dies of such use, it has been found that the face plates of the die, referred to herein as die plates, may be fabricated through use of the controlled explosion process for forming metal objects. After they are formed, the die plates are then reinforced by a backing of a cast metal or hardenable material such as an epoxy resin to form die members. Also other conventional forming methods may be used in conjunction with this process. A method of forming working die plates from sheet metal has been perfected and is described in a number of technical publications including "High Energy Rate Metal Forming," by E. W. Fedderson and A. H. Peterson published by the American Society for Metals and "Explosive Working of Metals," by J. Pierson and J. S. Rinehart (Pergammon, Great Britain). Generally, this technique consists of placing a sheet of metal across the base of a female die or cavity, evacuating air from within the cavity, placing the entire structure with an enclosed chamber filled with a suitable fluid and causing a controlled explosion within the chamber but external of the die cavity so that the force upon the fluid will depress the sheet and cause it to conform with the surface of the cavity or female die member. The die plate thus formed is attached to a reinforcing, such as a backing of the aforementioned epoxy resin, and used as a die member.

One of the difficulties encountered when it is desired to form die plates by the explosion technique which are correctly shaped to reproduce pieces from a given model, is that in making the impression to be used as a female die it is necessary to compensate for the thickness of the sheet of metal which is to be used to form the die plate. Because such sheets must be of a fairly substantial gauge to withstand the forces used in reproducing the articles, this variance in dimension due to the thickness of the sheets cannot be tolerated. For instance, if it is desired to form a sheet of metal into a die plate to be used in forming an irregular shape such as an automobile fender having a predetermined interior dimension of, for instance, X inches, and the sheet of metal was forced to assume the configuration of an impression of a model of this shape, the resulting die plate would have a reverse impression of less than X inches due to the thickness of the metal sheet.

Accordingly, it is an object of this invention to provide a process for forming an impression from a model which impression may be used in the explosion process or other forming techniques to produce die plates having the exact desired dimension to form an object of the exact size as the model when used as dies.

It is another object of this invention to provide an inexpensive method of producing die plates which requires no machining of an impression of the object to be reproduced as is usually required in preparing dies for forging, casting or stamping.

Other objects and advantages of this invention will be apparent to those skilled in the art, reference being made to the accompanying drawings which illustrate the sequence in which the process of this invention is performed.

In general, the method of this invention is concerned with the formation of die plates, both positive and negative, which can be used in stamping operations. The method consists of forming an undersized negative impression of the ultimate object which it is desired to reproduce, covering the surface of said negative impression with a first sheet of metallic material having a thickness equal to the amount that said negative impression is undersized, a second adjacent sheet having a thickness equal to that of the object to be reproduced and an adjacent third metallic sheet, and causing said sheets to closely deform to the contour of said negative impression, whereby, when said second sheet is removed, said first and third sheets form upper and lower die plates which, when mated, have an interior die cavity conforming in shape to the object to be reproduced.

In another embodiment, this invention is concerned with a method of making a single die plate. This method consists of forming a negative impression of the ultimate object which it is desired to reproduce, and which is undersized by an amount equal to the thickness of the sheet of metallic material from which it is desired to make a die plate, covering the surface of said impression with a sheet of metallic material having a thickness equal to the amount said negative impression is undersized, and causing said sheet to closely deform to the contour of said negative impression, thereby forming a die plate having an impression equal to the dimensions of the object to be reproduced.

While the above method relates to the formation of a negative die plate, the method is equally applicable to the formation of positive plates. In that instance instead of beginning with an undersized negative impression, it would be necessary to use an undersized positive impression. The term undersized as used herein is relative; thus, for example, if the surface of the object to be reproduced is concave, an undersized negative impression would be an impression having interior dimensions greater than the surface of the object. If the surface of the object is convex, then the term undersized negative impression would refer to a negative impression having interior dimensions less than the surface of the object.

The undersized negative impression which is used in the method of this invention can be formed in a number of different ways, the manner of formation being immaterial.

One such way would be to machine out the negative impression, or use could also be made of the electrode erosion process. The above methods would involve very careful calculations in order that the impression could be uniformly undersized to a thickness equal to the thickness of the die plate.

Another and easier method involves the forming of a series of impressions from a model of the object to be made, and ultimately ending up with the desired undersized impression. This method also constitutes an embodiment of this invention and will be described below.

Generally, this method consists of the steps of forming a first impression from a model of the object to be reproduced, which impression will accurately conform to the surfaces of a portion of the model or preferably to half of the model if there is no undercutting. This first impression is then used to make a second impression whose outline would be the reverse of the first impression which corresponded to a portion of the surface of the model. Upon the second impression is placed a layer or coating of a deformable substance, such as sheet wax, which builds up the second impression a distance equal to the thickness of the plate to be used as the die plate. Next a third impression, or what is termed herein a negative impression, is cast upon the second impression plus its surface conforming coating so that the negative impression is larger than the true surface of the object by the thickness of the layer and consequently by the thickness of the die plate to be formed. Then, using the explosion technique as has been described above, the metal plate is placed over the cavity in the negative impression and is caused, by the fluid force, to assume its configuration. Because the plate is of the same thickness as the coating over which the negative impression was formed, the working face of the plate will correspond exactly to the portion of the surface of the pattern.

If the object to be formed is a stamping of sheet metal having uniform thickness throughout, this method also enables the preparation of two opposed halves of a die through the explosion forming technique. In place of the single layer of metal to be formed by the explosion process, this single layer plus a second layer corresponding in thickness to that of the object to be formed, and a third layer to be used as the other die half are caused to conform to the outline of the negative impression. When the second layer is removed, the first and third layers, when matched, form a cavity conforming identically to the shape, size and configuration of the object to be formed, as will be apparent from the detailed description below.

Still another method of making the undersized negative impression would be to apply to the surface of the model of the object to be reproduced a deformable substance such as the sheet wax mentioned above of a thickness equal to the thickness of the plate to be used as the die plate, and then cast another impression on top of the model plus the surface conforming coat, thereby forming an undersized negative impression.

In general, the die plates are made of stainless steel because of its long wearing qualities, although titanium and other hard metals can be used. Stainless steel and titanium have mirror-like surfaces and will outwear cast iron, a conventional die material.

Where the three sheet method of forming die plates is used as described above, the center sheet will be of the same material as the ultimate object, i.e., in the case where auto body panels are being made, it will be body steel.

In the drawings, FIG. 1 is a view in perspective, partly cut away, of a model of one-half of an automobile gas tank, which may be reproduced in accordance with the present invention;

FIG. 2 is a cross-sectional view of an undersized negative impression of the upper surface of the object shown in FIG. 1:

FIG. 3 schematically illustrates the method of placing the layer or layers of sheet metal upon the undersized negative impression for forming of die plates by the explosion technique;

FIG. 4 schematically illustrates the layers as they are forced to conform to the cavity within the negative impression by the explosion process; and FIG. 5 shows die plates with appropriate reinforcing as they would be used in reproducing objects identical to the object shown in FIG. 1.

Referring to FIG. 1, a stamped sheet metal object, such as one-half of an automobile gas tank 10, is used to illustrate the method for forming both die plates of a complete die. Because the gas tank half 10 is stamped from sheet metal having a uniform thickness throughout, the method of this invention may be used to form both die plates in the same operation. While the invention is described below in terms of forming upper and lower die plates which when suitably supported may be used to form the gas tank half 10 shown in FIG. 1, it is to be understood that more complex shapes may be formed by three or more part dies and that the method of producing these die plates is similar in each case.

A cross section of a negative impression 11 of the outer surface of the gas tank half 10 shown in FIG. 1 is illustrated in FIG. 2. This impression can be wood, cast epoxy, or even metal if desired, and can be made by any desired means. The preferred means, however, is in accordance with the method described herein. The dimensions of the impression, however, are such that it is undersized by the thickness of the metal sheet from which it is desired to make a die plate.

If the negative impression is to be made in the specific manner described herein which illustrates a preferred embodiment of this invention, then a model for the gas tank half 10 is placed in a casting jig so that a first "female" impression may be cast upon its upper, exposed surface. The material used for casting the first impression may be an appropriate casting material such as an epoxy resin which may be initially in liquid or semipaste form to easily conform to the configuration of the model, and may be hardened in situ and then removed from the casting jig.

The cavity or working surface formed within the first impression corresponds exactly to the configuration and dimensions of the upper surface of the gas tank half 10. For example, if the width of the gas tank half is X inches, the width of the cavity within the first impression is also X inches.

After the first impression has been sufficiently set, it is placed in a second casting jig in inverted position and a second male impression or mirror pattern is formed by again casting a hardenable material, such as the epoxy resin, within the cavity of the first impression. It will be apparent that the surface of the second impression or male impression conforms to the pattern of the upper surface of the gas tank half 10, so that the width of the second impression or male pattern will be X inches. After the second or male impression has been hardened, a layer of a deformable material is placed upon the formed surface of the second male impression. The deformable layer or coating, which may be sheet wax or other readily deformed material which has a fixed thickness, is selected such that its thickness is the same as the thickness of the metal plate which is to be used for the die plate. It will be apparent that the outer dimensions of the second or male impression with the deformable material layer thereon will be larger than the outer dimensions of the gas tank half 10. The largest dimension of the formed surface of the second or male impression plus its layer of deformable material, will be of a dimension $X+2D$ inches, where D equals the thickness of the deformable material in inches.

The second or male impression plus its coating of deformable material is then placed in another casting jig and a third impression, the negative impression referred to herein, of a hardenable material is cast thereupon. The largest dimension of the cavity formed in the third or negative impression is of size $X+2D$ inches, as indicated in FIG. 2.

When the negative impression has been hardened it is ready for use as the pattern in forming the die plates through use of the explosion technique. Referring to FIG. 3, the negative impression 11 is placed within the lower portion of a reinforced enclosure 12 with its cavity or opening facing upwards. Three plates 13, 14 and 15 are placed across the cavity and are held in close contact with the outer surfaces of the negative impression 11 by means of clamps or angle irons 16 bolted to the negative impression 11, forming an air tight seal. The first or bottom plate 13 as it is shown in FIG. 3, is a metal plate which will ultimately form one of the die plates for reproducing the article shown in FIG. 1. The thickness of this plate, as previously explained, is equal to the thickness of the deformable coating used in preparing the negative impression. The second or intermediate plate 14 is selected to have a thickness of gauge equal to that of the object to be formed, such as the gas tank half 10 shown in FIG. 1. The third or top plate 15, which will ultimately be the other die plate used to form the final object, need not necessarily have any particular thickness in this example, but is preferably of the same gauge as the first plate 13.

With the plates in position as shown in FIG. 3, the air space within the cavity of the negative impression 11 and below the plate 13 is evacuated and the space 17 above the plates and around the negative impression 11 is filled with a pressure transmitting fluid or liquid, such as a hydraulic fluid. Then, with this space 17 under a slight amount of pressure, the controlled explosion, which may originate in the orifice designated by reference numeral 18, takes place and the pressure transmitted therefrom causes the three plates 13, 14 and 15 to be deformed downwardly to closely conform with the surfaces of the cavity within the negative impression 11.

Referring to FIG. 4, with the negative impression 11 and the plates 13, 14, and 15 removed from the explosion forming enclosure, it will be seen that the first and third plates 13 and 15 are separated by the second plate 14 which has assumed the exact configuration of the object to be formed, such as the gas tank half 10. As previously explained, the largest dimension of the recess within the negative impression 11, and thus the outer edges of the first plate 13 in this area is $X+2D$ inches. Therefore the inner edges in this plate 13, as indicated in FIG. 4, have a dimension of X, corresponding to the desired outer dimension of the final object 10 shown in FIG. 1. Additionally, the third plate 15 will have the proper dimension and spacing from the plate 13 to form the other die half, because it was properly positioned from the first plate 13 by the second plate 14 which had a thickness the same as the object 10.

Finally, FIG. 5 shows the first and third plates 13 and 15 as they would be used to form objects, such as the gas tank half 10, with appropriate reinforcing backings 19 and 20 respectively. These reinforcing backings 19 and 20 may be comprised of a hardenable material, such as an epoxy resin, or a castable metal and the entire die plates 13 and 15 with their backings 19 and 20 are placed within opposed fixed and moving mold or die platens.

It will be apparent that the previously described process is advantageous in that it eliminates the costly and time consuming process for machining such molds and also in producing sheet metal stamped objects such as the gas tank halves 10 shown in FIG. 1, and that both die halves may be formed in one process. It will be apparent, however, that objects having non-uniform thicknesses may be produced by this process by forming each mold portion separately. Thus in the process previously described in detail, the negative impression of FIG. 2 will be provided, and in the explosion forming technique shown in FIG. 3, a single sheet 13 would be used to form one die plate of the matching pair of die plates. Then using a negative impression of the opposed surfaces, the other die plate would be formed in the explosion process of FIG. 6. In either case, the process is similar in that it compensates for the thickness of the die plate by using the negative impression as described with reference to FIG. 2.

Various modifications of the above described preferred embodiments may be made without departing from the spirit and scope of the appended claims.

I claim:

1. A method of forming matching die plates which, when mated, have an interior cavity conforming in shape to an object to be reproduced, said method comprising the steps of (1) forming an undersized negative impression of the object to be reproduced, (2) covering the surface of said undersized negative impression with a first sheet of metallic material having a thickness equal to the amount by which said negative impression is undersized, an adjacent second sheet of material having a thickness equal to the thickness of such object to be reproduced and an adjacent third sheet of material, (3) deforming said first, second and third sheets into close conforming relation with said negative impression in a manner such that said first sheet directly contacts and conforms closely to the surface contour of said impression whereby, when said second sheet is removed, said first and third sheets, when adjacent, will enclose an interior cavity conforming in shape to such object to be reproduced.

2. The method of claim 1 wherein said sheets are caused to conform to the contour of said negative impression by placing said sheets over the surface of said impression and subjecting the sheets to an external high intensity fluid pressure of short duration in a manner such that said sheets are pressed into direct contact with and conform upon the surfaces of said negative impression.

3. The method of claim 2 wherein said fluid pressure is created by controlled explosion within a confined space.

4. A method of forming a die plate having an exposed surface corresponding to a portion of the surfaces of an object to be reproduced, said method comprising the steps of (1) forming a first impression by casting a hardenable material upon such portion of the surfaces of such object and hardening said material, (2) forming a second impression by casting a hardenable material upon said first impression and hardening said material, (3) coating the surface of said second impression with a surface-conforming layer having a uniform depth equal to the thickness of said die plate to be formed, (4) forming a negative impression by casting a hardenable material upon said second impression and its surface-conforming layer thereon and hardening said material, (5) closely deforming a metallic sheet having a thickness equal to the depth of said conformable layer to the contour of said negative impression, thereby forming a die plate having an exposed surface conforming to such portion of the surfaces of such object to be reproduced.

5. A method of forming matching die plates which, when mated, have an interior cavity conforming in shape to an object to be reproduced, comprising the steps of (1) casting a first female impression of such object in a hardenable casting material and hardening said material, (2) casting a first male impression of a hardenable casting material upon said first female impression and hardening said material, (3) covering said first male impression with a surface-conforming coating of a deformable material, said coating having a uniform predetermined depth, (4) casting a negative impression of a hardenable casting material upon said first male impression and its said surface conforming coating and hardening said material, (5) covering the surface of said negative impression with a first sheet of metallic materials having a thickness equal to the depth of said surface-conforming material, an adjacent second sheet of material having a thickness equal to the thickness of such object to be reproduced and an adjacent third sheet of material, (6) causing said first, second and third sheets to closely deform to the contour of said negative impression whereby, when said second sheet is removed, said first and third sheets when adjacent, form matching die plates having an interior cavity conforming in shape to such object to be reproduced.

6. The method of claim 5 wherein said first male impression is covered with a layer of sheet wax having a uniform predetermined depth.

7. The method of claim 5 which further includes the step of casting upon the non-adjacent sides of said first and third sheets a backing of a substantial thickness of a hardenable casting material to provide reinforcement for said sheets.

8. The method of claim 5 wherein said sheets are caused to conform to the contour of said negative impressure whereby said sheets are pressed upon and con-impression and subjecting the sheets to an external fluid pressure whereby said sheets are perssed upon and conformed to said negative impression.

9. The method of claim 5 wherein said fluid pressure is created by a controlled explosion within a confined space.

References Cited

UNITED STATES PATENTS

| | | | |
|---|---|---|---|
| 2,005,591 | 6/1935 | Meyercord ---------- | 76—107 |
| 3,136,049 | 6/1964 | Throner et al. | |
| 3,343,430 | 9/1967 | Haas et al. ---------- | 71—107 |

BERNARD STICKNEY, Primary Examiner

U.S. Cl. X.R.

72—54, 56, 475